United States Patent
Hsiao

(10) Patent No.: US 7,215,722 B2
(45) Date of Patent: May 8, 2007

(54) DEVICE FOR WLAN BASEBAND PROCESSING WITH DC OFFSET REDUCTION

(75) Inventor: Yung-Sheng Hsiao, Taipei Hsien (TW)

(73) Assignee: ALI Corporation, Hsi-Chih, Taipei Hsien (TW)

( * ) Notice: Subject to any disclaimer, the term of this patent is extended or adjusted under 35 U.S.C. 154(b) by 675 days.

(21) Appl. No.: 10/250,155

(22) Filed: Jun. 9, 2003

(65) Prior Publication Data

US 2004/0247046 A1 Dec. 9, 2004

(51) Int. Cl.
*H04L 25/06* (2006.01)

(52) U.S. Cl. .................. 375/319; 375/345; 327/307

(58) Field of Classification Search ............... 375/319, 375/345; 455/245, 234, 247, 324, 130, 182.1–182.3, 455/191.1–192.3; 327/333, 307
See application file for complete search history.

(56) References Cited

U.S. PATENT DOCUMENTS

| 5,241,702 A | 8/1993 | Dent |
| 5,471,665 A | 11/1995 | Pace |
| 5,568,520 A | 10/1996 | Lindquist |
| 5,584,059 A | 12/1996 | Turney |
| 5,617,060 A | 4/1997 | Wilson |
| 5,712,637 A | 1/1998 | Lindquist |
| 6,009,126 A | 12/1999 | Van Bezooijen |
| 6,240,100 B1 | 5/2001 | Riordan |
| 6,404,829 B1 * | 6/2002 | Sonu ......................... 375/345 |
| 6,775,530 B2 * | 8/2004 | Severson et al. ........... 455/324 |
| 7,076,225 B2 * | 7/2006 | Li et al. ................. 455/245.1 |
| 2003/0096587 A1 * | 5/2003 | Wildhagen ............... 455/234.2 |
| 2003/0199264 A1 * | 10/2003 | Holenstein et al. ......... 455/324 |

* cited by examiner

*Primary Examiner*—Chieh M. Fan
*Assistant Examiner*—Julia Tu
(74) *Attorney, Agent, or Firm*—Winston Hsu

(57) ABSTRACT

A device for processing an intermediate analogue signal received from a previous system with a baseband processor. The processor includes an ordinary feedback loop for adjusting the strength of the intermediate analogue signal received from the previous system. The processor further includes a first DC offset reduction loop and a second DC offset reduction loop. A programmable filter bank and the corresponding control elements are provided so that the second DC offset reduction loop can reduce the DC offset in a flexible way. In the present invention, the DC offset can be reduced effectively and the gain training period relating to the previous system and the baseband processor can be shortened.

17 Claims, 10 Drawing Sheets

DC offset

Baseband signal

Quazi-DC offset

| DC offset detection | 0 | | | 1 | | 0 |
|---|---|---|---|---|---|---|
| HPF State | 10KHz | 5MHz | 1MHz | 100KHz | 10KHz | |
| AGC State | 1 | 2 | 3 | 4 | 5 | 1 |

Fig. 10

DEVICE FOR WLAN BASEBAND PROCESSING WITH DC OFFSET REDUCTION

BACKGROUND OF INVENTION

1. Field of the Invention

The invention relates to a device for baseband processing, and more particularly, to a device for WLAN (Wireless Local Area Network) baseband processing with DC (Direct Current) offset reduction.

2. Description of the Prior Art

In the wireless communication field, a zero-IF receiver (zero intermediate frequency receiver, or zero-IF RF, so-called direct-down conversion radio frequency receiver) is one of the practical choices for implementing a communication system. While receiving an antenna signal, which is a baseband signal representing transmitted data arithmetically multiplied by a carrier of a predetermined frequency, a zero-IF receiver derives the baseband signal from one multiplication of the received signal and the carrier rather than a plurality of multiplications of the received signal and carriers of intermediate frequencies, so that a cost-effective design of lower number of external parts can be achieved. Hence, the zero-IF receivers became popular. Of concern, the zero-IF receiver usually generates unwanted DC (Direct Current) offsets when the gain of an amplifier of a previous system for preprocessing in the zero-IF receiver is changed. Furthermore, during a direct-down conversion process (the baseband signal deriving process of the zero-IF receiver), some quasi-DC offsets (noises of low frequencies, whose spectrum locates near that of the DC offsets) are generated. Most of the zero-IF receivers have a built-in DC reduction function. However, it takes long time to reduce significant amounts of DC offset.

This DC offset reduction duration impacts the receiver performance in some wireless applications, for example, IEEE 802.11 Wireless LAN. Because of its packet transmission architecture, WLAN (Wireless Local Area Network) receivers have limited time to perform the AGC (Auto-Gain Control, that is, gain control training, or gain training), which adjusts the strength of an intermediate analogue signal generated by the previous system to achieve better dynamic range of the intermediate analogue signal for further baseband processing by a baseband processor. The lower the DC offset during the gain training period, the more accurate the gain setting by the baseband processor.

FIG. 1 is a diagram of related signals, waveforms, and time sequences while the zero-IF receiver and the baseband processor are operating. In FIG. 1, from top to bottom, the waveforms drawn with solid-lines represent the DC offset, the baseband signal, the quasi-DC-offset, and the composite signal (the intermediate analogue signal) where the baseband signal, the quasi-DC-offset, and the composite signal are shown with envelopes of the signal sweeps. The pattern inside the envelopes represents the components of each signal parabolically. The horizontal axis denotes the time, and the vertical axis denotes the signal amplitude. A signal packet shown in FIG. 1 starts at t0 and ends at t2 along the time axis. A significant DC offset arises at the beginning of the signal packet (that is, at t0). The interval between t0 and t1 represents the gain training period.

Please refer to FIG. 2 showing a block diagram of a combination of a zero-IF receiver 100 and a baseband processor 200 according to the prior art. The signal connection between the zero-IF receiver 100 and the baseband processor 200 can be either differential or a single-ended connection. For simplicity of comparison between the present invention and the prior art and focusing on the novelty of the present invention, only single-ended connection will be illustrated in the following. The related previous system 102 of the baseband processor 200 is shown in the zero-IF receiver 100. The previous system 102 is coupled to an antenna 104 for preprocessing an antenna signal detected by the antenna 104. The previous system 102 comprises an LNA 106 (Low Noise Amplifier) coupled to the antenna 104 for amplifying the signal detected by the antenna 104 and generating at an output an amplified signal, a mixer 108 coupled to the output of the LNA 106 for mixing the amplified signal with an oscillator signal of a predetermined frequency received from an Osc 110 (Oscillator) and generating at an output a mixed signal, a GA 112 (Gain Amplifier) coupled to the output of the mixer 108 for adjusting the strength of the mixed signal according to a gain control signal received from a gain controller 204 of the baseband processor 200 and generating at an output an adjusted signal, and an LPF 114 (Low Pass Filter) coupled to the output of the GA 112 for filtering the adjusted signal and generating the intermediate analogue signal as the output of the previous system 102 and as the output of the zero-IF receiver 100. The baseband processor 200 comprises an ADC 202 (Analogue-to-Digital Converter) coupled to the output of the previous system 102 for converting the intermediate analogue signal received from the previous system 102 into a digital signal and generating at an output the digital signal, the gain controller 204 coupled to the output of the ADC 202 for estimating a DC (Direct Current) offset of the digital signal and generating at an output the gain control signal, and a demodulator 206 coupled to the output of the ADC 202 for demodulating the digital signal.

As mentioned, the unwanted DC offset introduced into the baseband processor from the previous system 102 will make the ADC 202 saturated. Most baseband processors have a built-in RF gain controller such as the gain controller 204 of FIG. 2 to reduce the gain of an amplifier such as the GA 112 of FIG. 2 when an ADC such as the ADC 202 is saturated, but this does not reduce the DC offset and indeed decreases the dynamic range of the intermediate analogue signal. Most of the zero-IF receivers have a built-in DC reduction function but it takes a long time to reduce significant amounts of DC offset and does not match the requirement of a system having limited process time to perform AGC mentioned above.

SUMMARY OF INVENTION

It is therefore a primary objective of the claimed invention to provide a device for WLAN (Wireless Local Area Network) baseband processing with DC (Direct Current) offset reduction, to solve the above-mentioned problem.

The claimed invention provides a device for processing an intermediate analogue signal received from a previous system with a baseband processor. The baseband processor includes a programmable filter bank coupled to the previous system, the programmable filter bank having a plurality of frequency pass characteristics, an ADC (Analogue-to-Digital Converter) coupled to an output of the programmable filter bank, a gain controller coupled to an output of the ADC, the gain controller has a first output for sending a gain control signal to the previous system, a DC (Direct Current) estimator coupled to the output of the ADC, a DAC (Digital-to-Analogue Converter) coupled to a first output of the DC estimator, an arithmetic module coupled to an output of the DAC and to the output of the programmable filter bank, and a DCF (DC-Filter) controller coupled to a second output of the DC estimator and to a second output of the gain controller, the DCF controller has an output for sending a filter state signal to the programmable filter bank.

According to the claimed invention, a baseband processor for processing an intermediate analogue signal received from a previous system includes a programmable filter bank, an ADC (Analogue-to-Digital Converter), a gain controller, a DC estimator, a DAC (Digital-to-Analogue Converter), an arithmetic module, and a DCF (DC-Filter) controller.

The programmable filter bank is coupled to the previous system for filtering the intermediate analogue signal according to a filter state signal received from a filter state input and generating at an output a filtered signal, the programmable filter bank having a plurality of frequency pass characteristics. The ADC (Analogue-to-Digital Converter) is coupled to the output of the programmable filter bank for converting the filtered signal into a digital signal and generating at an output the digital signal as an output signal of the baseband processor. The gain controller is coupled to the output of the ADC for estimating a DC (Direct Current) offset of the digital signal and generating at a first output a gain control signal and at a second output a gain state signal, the gain control signal instructing the previous system to adjust a strength of the intermediate analogue signal. The DC estimator is coupled to the output of the ADC for estimating the DC offset of the digital signal and generating at a first output a first DC offset signal and at a second output a second DC offset signal corresponding to the DC offset. The DAC (Digital-to-Analogue Converter) is coupled to the first output of the DC estimator for receiving as an input the first DC offset signal and generating at an output a feedback signal corresponding to the first DC offset signal. The arithmetic module is coupled to the output of the DAC and to the output of the programmable filter bank, the arithmetic module subtracting the feedback signal from the filtered signal for canceling DC offsets of the programmable filter bank and the ADC. The DCF (DC-Filter) controller is coupled to the second output of the DC estimator and to the second output of the gain controller for instructing the programmable filter bank which of the plurality of the frequency pass characteristics of the programmable filter bank are enabled for reducing DC offsets of the previous system, the programmable filter bank, and the ADC, the DCF controller receiving as inputs the second DC offset signal and the gain state signal and generating the filter state signal at an output, to which the filter state input of the programmable filter bank is coupled.

According to the claimed invention, the programmable filter bank may further include a plurality of filters coupled to the previous system. The programmable filter bank may further include a multiplexer for receiving output signals of the plurality of filters and generating at the output of the programmable filter bank the filtered signal.

These and other objectives of the claimed invention will no doubt become obvious to those of ordinary skill in the art after reading the following detailed description of the preferred embodiment that is illustrated in the various figures and drawings.

BRIEF DESCRIPTION OF DRAWINGS

FIG. 10 is a state transition diagram of a preferred embodiment of the programmable filter bank in FIG. 3.

DETAILED DESCRIPTION

Figure 2:
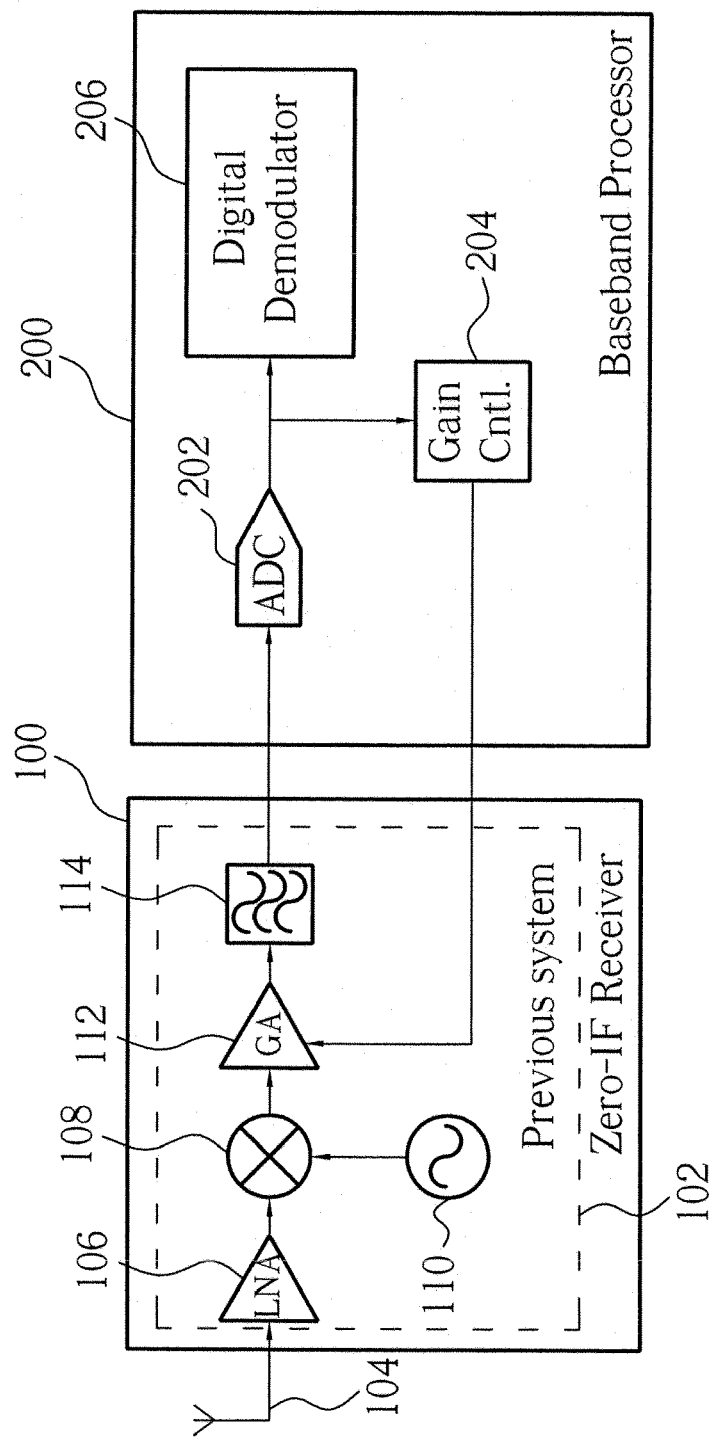
FIG. 2 is a block diagram of a combination of a zero-IF receiver and a baseband processor according to the prior art.
Figure 3:
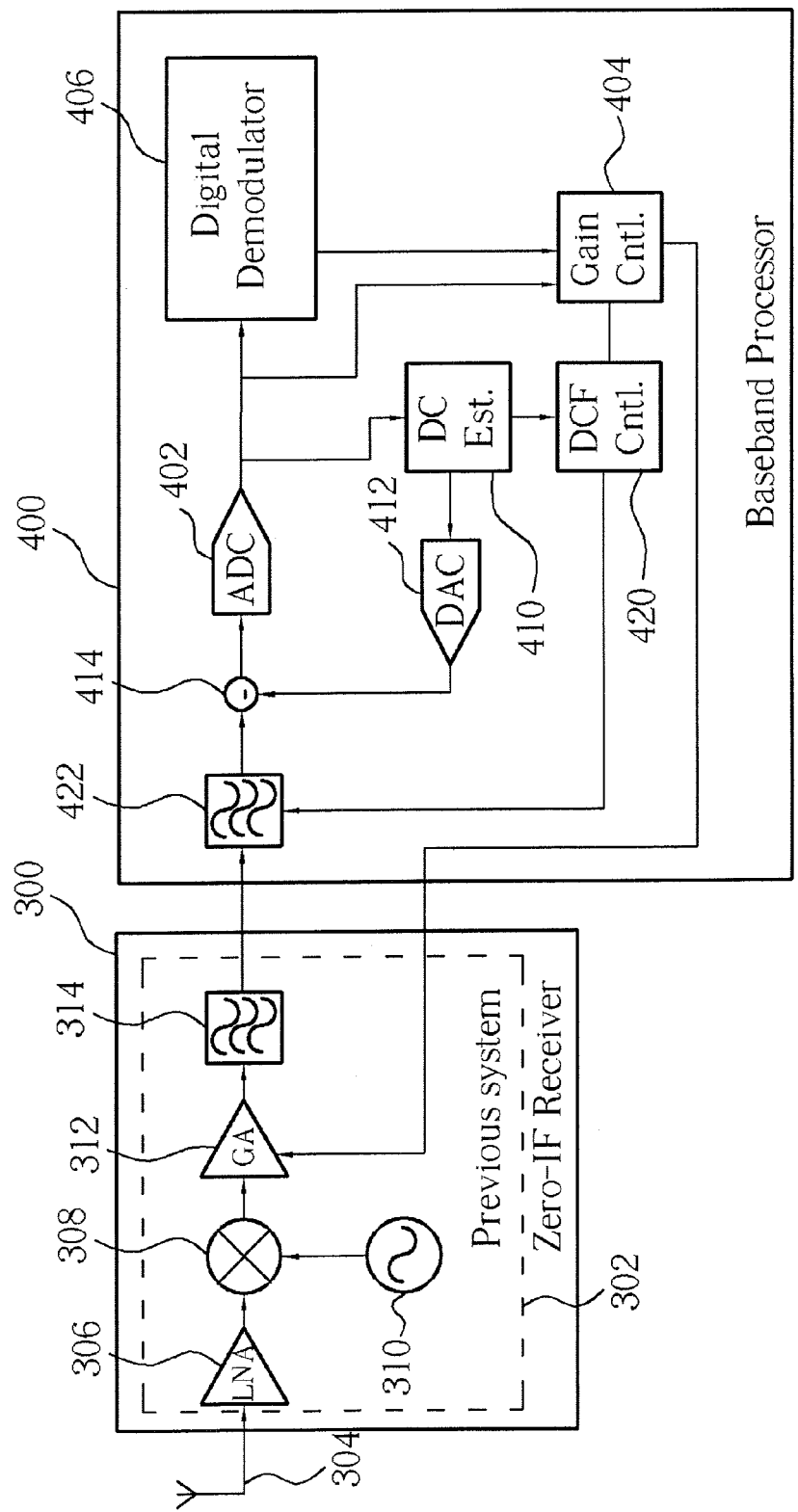
FIG. 3 is a block diagram of a combination of a zero-IF receiver and a baseband processor according to the present invention.

Please refer to FIG. 3 showing a block diagram of a combination of a zero-IF receiver 300 and a baseband processor 400 according to the present invention. The signal connection between the zero-IF receiver 300 and the baseband processor 400 can be either differential or single-ended connection. For simplicity of comparison between the present invention and the prior art and focusing on the novelty of the present invention, only the single-ended connection will be illustrated in the following. Nevertheless, the present invention can apply to the differential connection. The zero-IF receiver 300 in FIG. 3 is exactly the same as the zero-IF receiver 100 in FIG. 2 except that index numbers of the components are reassigned. The function of each component in the zero-IF receiver 300 is the same as that in the zero-IF receiver 100.

The baseband processor 400 for processing an intermediate analogue signal received from a previous system 302 comprises a programmable filter bank 422, an ADC 402 (Analogue-to-Digital Converter), a gain controller 404, a DC estimator 410, a DAC 412 (Digital-to-Analogue Converter), an arithmetic module 414, and a DCF (DC-Filter) controller 420.

The programmable filter bank 422 is coupled to the previous system 302 for filtering the intermediate analogue signal according to a filter state signal received from a filter state input and generating at an output a filtered signal. The programmable filter bank 422 has a plurality of frequency pass characteristics. The ADC 402 is coupled to the output of the programmable filter bank 422 for converting the filtered signal into a digital signal and generating at an output the digital signal as an output signal (described in the next paragraph) of the baseband processor 400. The gain controller 404 is coupled to the output of the ADC 402 for estimating a DC (Direct Current) offset of the digital signal and generating at a first output a gain control signal and at a second output a gain state signal. The gain control signal instructs the previous system 302 to adjust a strength of the intermediate analogue signal. The DC estimator 410 is coupled to the output of the ADC 402 for estimating the DC offset of the digital signal and generating at a first output a first DC offset signal and at a second output a second DC offset signal corresponding to the DC offset. The DAC 412 is coupled to the first output of the DC estimator 410 for receiving as an input the first DC offset signal and generating at an output a feedback signal corresponding to the first DC offset signal. The arithmetic module 414 is coupled to the output of the DAC 412 and to the output of the programmable filter bank 422. The arithmetic module 414 subtracts the feedback signal from the filtered signal for canceling DC offsets of the programmable filter bank 422 and the ADC 402. The DCF (DC-Filter) controller 420 is coupled to the second output of the DC estimator 410 and to the second output of the gain controller 404 for receiving the second DC offset signal to instruct the programmable filter bank 422 having the plurality of the frequency pass characteristics to reduce DC offsets of the previous system 302. The DCF controller 420 receives the second DC offset signal, may receive the gain state signal, and generates the filter state signal at an output, to which the filter state input of the programmable filter bank 422 is coupled.

Although in the preferred embodiment the baseband processor 400 further comprises a demodulator 406 coupled to the output of the ADC 402 for demodulating the digital signal, and the gain controller 404 further comprises a receiver state input coupled to an output of the demodulator 406 for receiving a receiver state signal, this is not limiting. The demodulator 406 can be installed either in the baseband processor 400 or outside the baseband processor 400. The receiver state signal can be generated by the gain controller 404 according to the detected signal derived from the digital signal received from the output of ADC 402.

Figure 1:
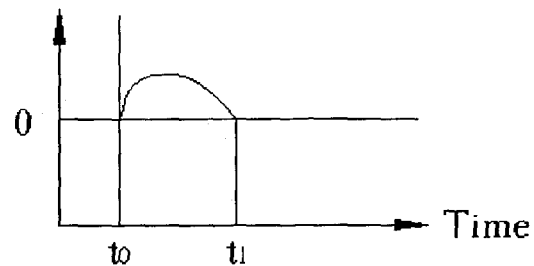
FIG. 1 is a diagram of related signals, waveforms, and time sequences of a prior art zero-IF receiver and baseband processor.
Figure 1:
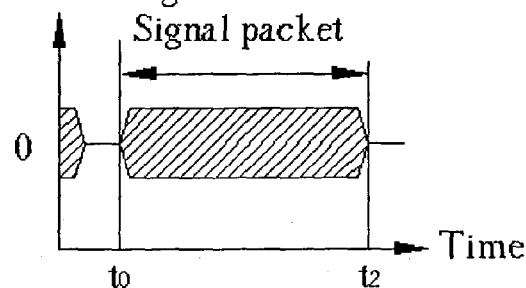
Figure 1:
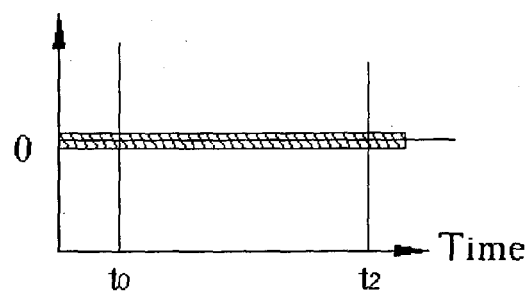
Figure 1:
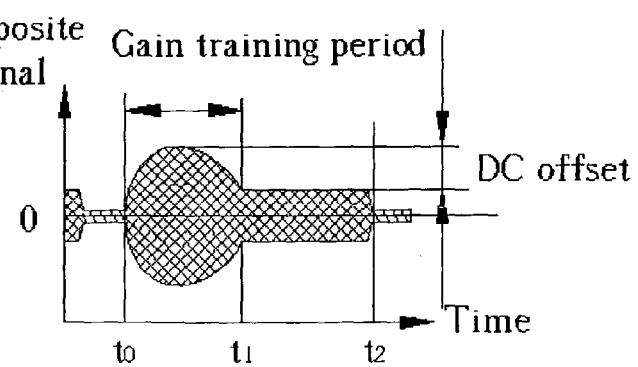

Of concern is that the DC estimator 410, the DAC 412, and the arithmetic module 414 form a first DC offset reduction loop, which can effectively increase the ADC dynamic range by reducing the DC offset. In addition, the DCF controller 420 is coupled to the DC estimator 410, to the gain controller 404, and to the programmable filter bank 422 forming a second DC offset reduction loop, which can determine when and how much the DC offset is to be reduced with the programmable filter bank 422 and effectively shorten the DC offset transition period such as the gain training period shown in FIG. 1.

Figure 4:
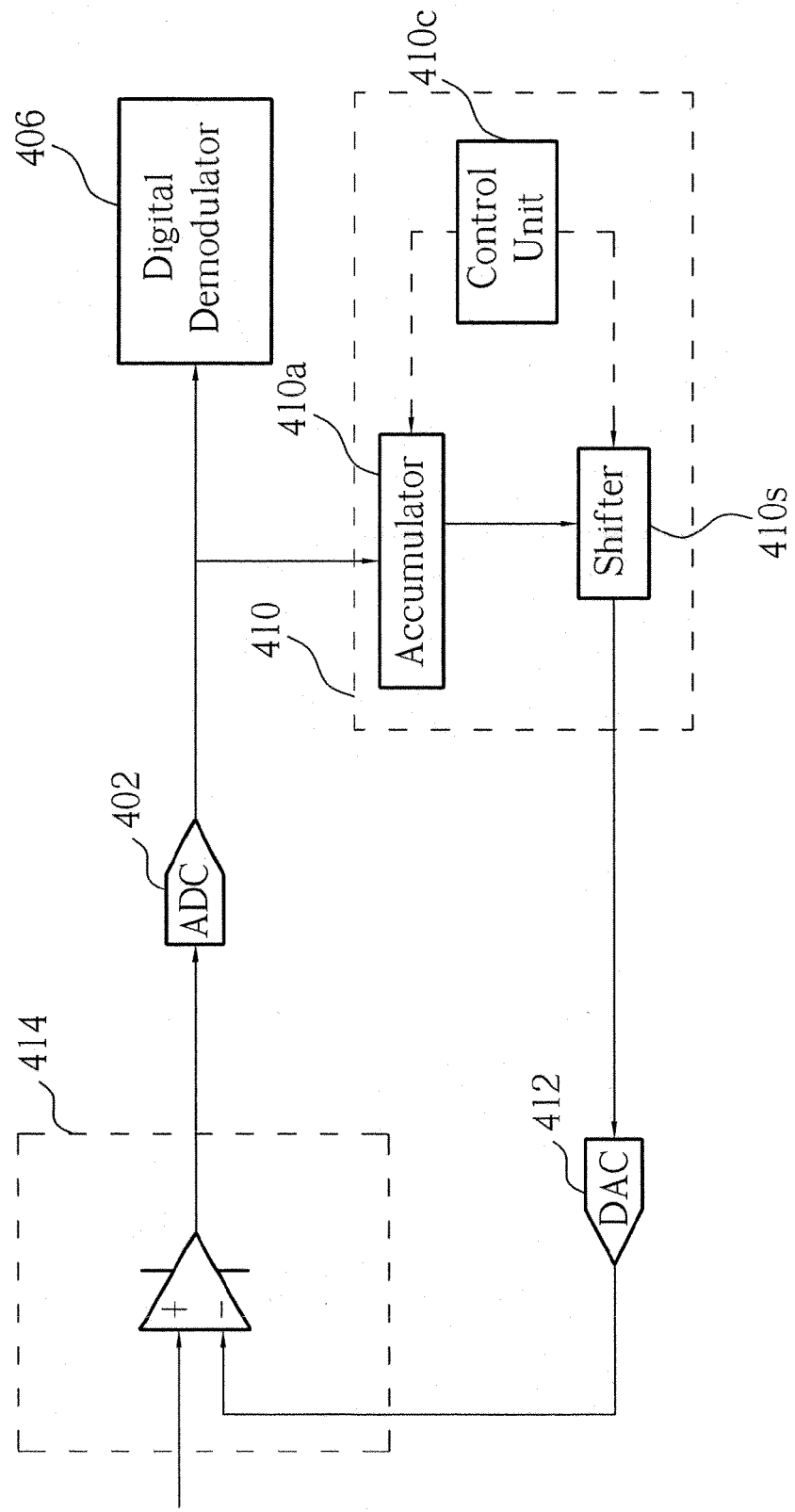
FIG. 4 is a block diagram of the first DC offset reduction loop in FIG. 3.

Please refer to FIG. 4 showing a block diagram of the first DC offset reduction loop in FIG. 3 in detail. The DC estimator 410 further comprises an accumulator 410$a$, a shifter 410$s$, and a control unit 410$c$. The accumulator 410$a$ is coupled to the output of the ADC 402 for averaging the digital signal received from the ADC 402 and generates at an output an average signal according to an accumulating control signal received from an accumulating control input. The shifter 410$s$ is coupled to the output of the accumulator 410$a$ for shifting the average signal to the DAC 412 according to a shifting control signal received from a shifting control input and generates at the first output of the DC estimator 410 the first DC offset signal. The control unit 410$c$ generates at a first output the accumulating control signal and at a second output the shifting control signal. The accumulating control input of the accumulator is coupled to the first output of the control unit and the shifting control input of the shifter is coupled to the second output of the control unit.

In FIG. 4, the control unit 410$c$ determines switch timing for the accumulator 410$a$ to accumulate a block of signals during a predetermined interval along the time axis and send the accumulated result to the shifter 410$s$ so that a repeating averaging process can be achieved. Then, the DAC 412 digitizes the signal generated by the shifter and the arithmetic module 414, comprising an inverter and an adder (not shown in FIG. 4), subtracts the feedback signal (the digitized signal received from the DAC 412) from the filtered signal (received from the programmable filter bank 422) for canceling DC offsets of the programmable filter bank 422 and the ADC 402. Of course, the resolution of the DAC 412 can be less than the resolution of the ADC 402 if a simplified implementation is chosen.

Figure 5:
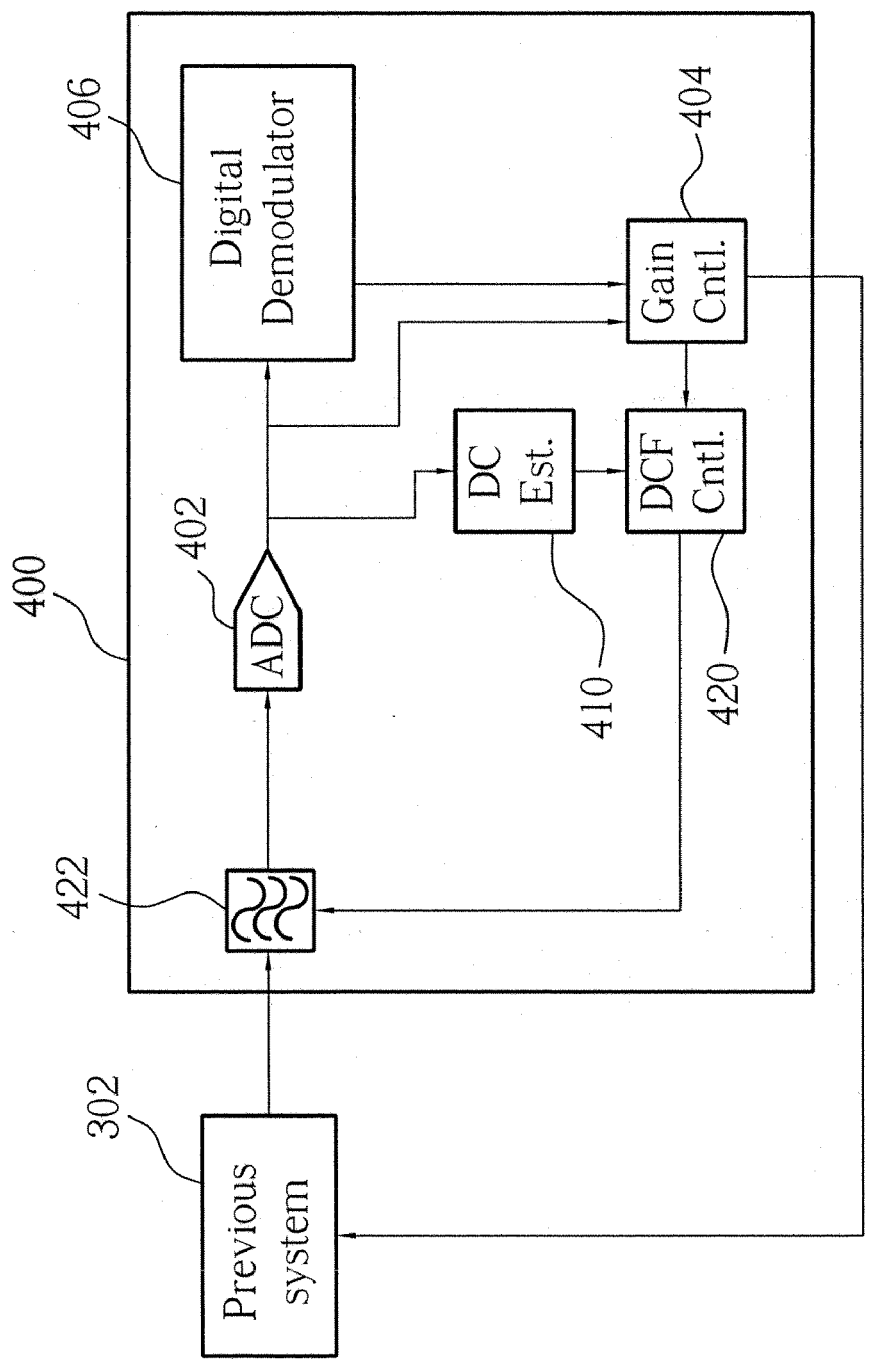
FIG. 5 is a block diagram of the second DC offset reduction loop in FIG. 3.

Please refer to FIG. 5 showing a block diagram of the second DC offset reduction loop in FIG. 3. In the preferred embodiment, the programmable filter bank 422 further comprises a plurality of filters (not shown, but described in detail later) coupled to the previous system. The DCF controller 420 coupled to the second output of the DC estimator 410 and to the second output of the gain controller 404 instructs the programmable filter bank 422 which of the plurality of the filters of the programmable filter bank 422 are enabled for reducing the DC offsets of the previous system 302, the programmable filter bank 422, and the ADC 402. The DCF controller 420 receives as inputs the second DC offset signal and the gain state signal and generates the filter state signal at an output, to which the filter state input of the programmable filter bank 422 is coupled.

Figure 6:
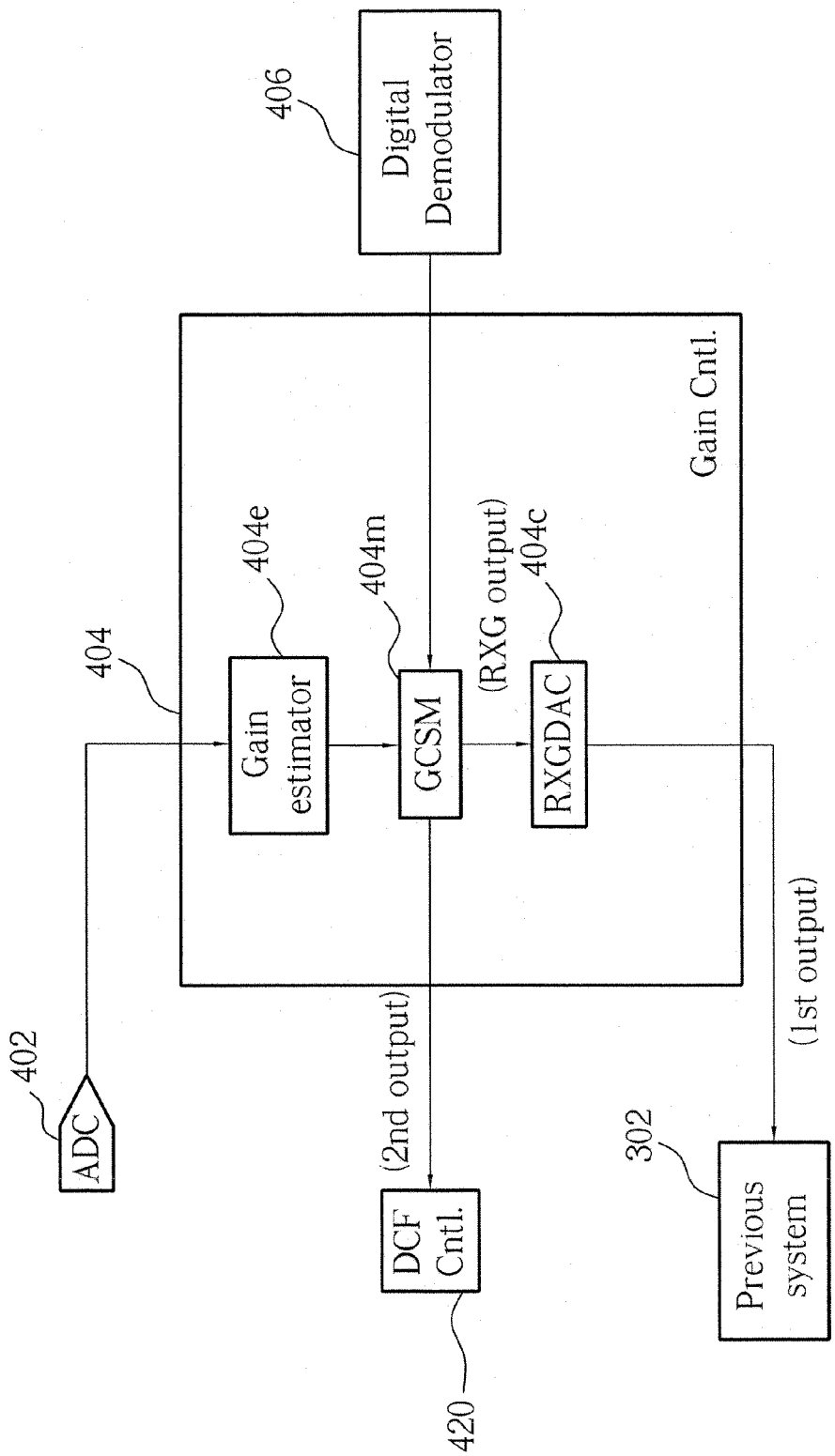
FIG. 6 is a block diagram of the gain controller in FIG. 3.

Please refer to FIG. 6 showing a block diagram of the gain controller 404 in FIG. 3 in detail. The gain controller 404 further comprises a gain estimator 404$e$, a GCSM 404$m$ (Gain Control State Machine), and an RXGDAC 404$c$ (Receiver Gain DAC). The gain estimator 404$e$ is coupled to the output of the ADC 402 for estimating the strength of the digital signal received from the ADC 402 and generates at an output a strength information signal. The GCSM 404$m$ is coupled to the output of the gain estimator 404$e$ and to the output of the demodulator 406 through the receiver state input and generates at an RXG (Receiver Gain) output an RXG signal and at the second output of the gain controller 404 the gain state signal according to the strength information signal received from the gain estimator 404$e$ and the receiver state signal received from the demodulator 406. The RXGDAC 404$c$ is coupled to the RXG output of the GCSM 404$m$ for converting the RXG signal received from the GCSM 404$m$ into an analogue form and generates at the first output of the gain controller the gain control signal.

Figure 7:
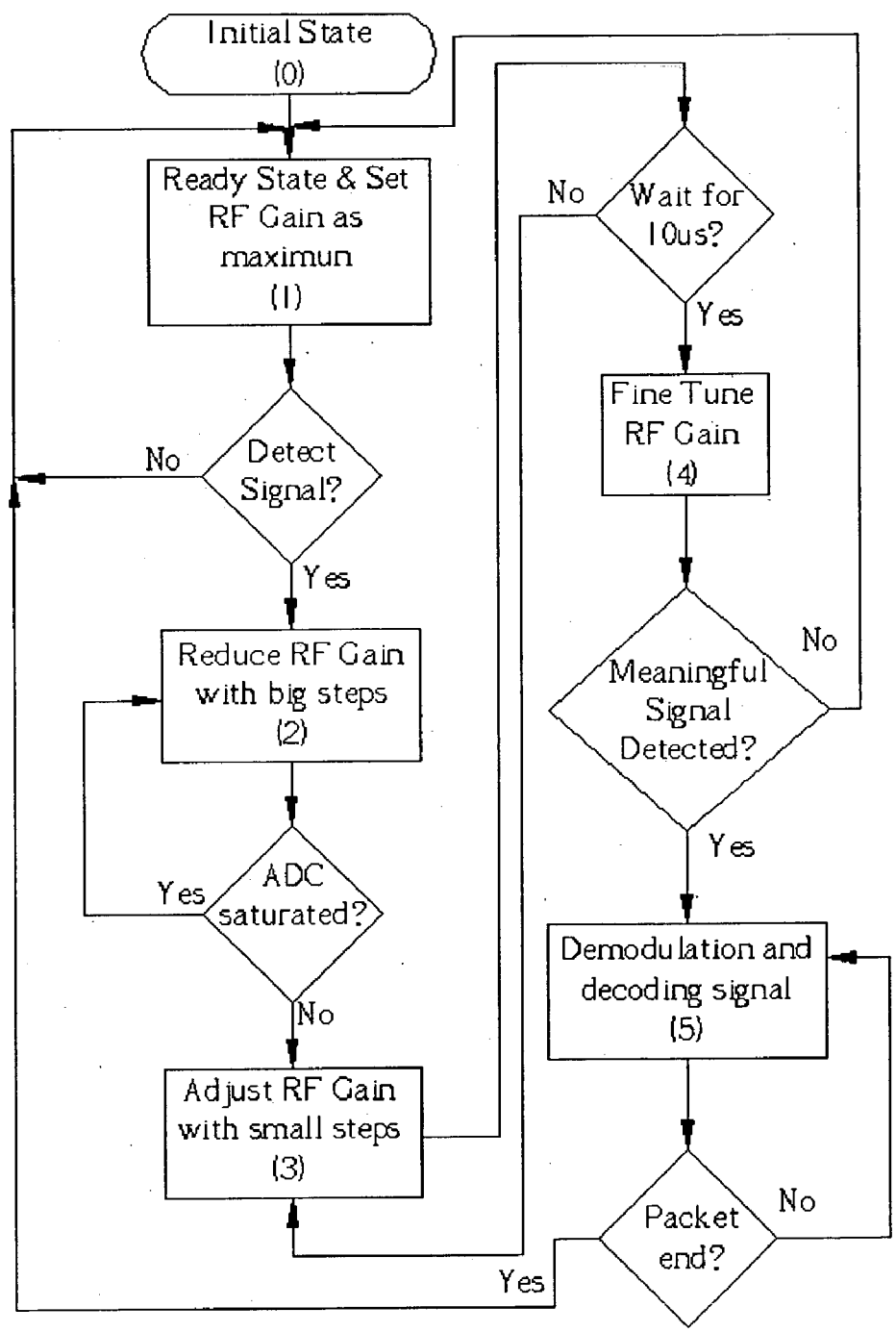
FIG. 7 is a flowchart of the process of the gain controller in FIG. 3.

In FIG. 6, the GCSM 404$m$ determines the gain state signal according to the strength information signal received from the gain estimator 404$e$ and the receiver state signal received from the demodulator 406, which will be described in detail with the following. FIG. 7 shows a flowchart of the process of the gain controller 404 in FIG. 3, that is, a process flow of the GCSM 404$m$. The gain control signal instructs the previous system 302 to adjust the strength of the intermediate analogue signal with a corresponding gain value of the previous system 302. The previous system 302 increases the strength of the intermediate analogue signal when the gain value is increased and decreases the strength of the intermediate analogue signal when the gain value is decreased. The GCSM 404$m$ has an initial state (State 0), a ready state (State 1), a reducing state (State 2), an adjusting state (State 3), a fine-tuning state (State 4), and a demodulation state (State 5). The process is described as follows.

Step 100: Enter the initial state (0) when the GCSM 404$m$ starts to operate.

Step 102: Initialize the GCSM 404$m$ at the initial state (0).

Step 104: Transfer from the initial state (0) to the ready state (1) after the GCSM 404$m$ is initialized.

Step 106: Set the gain value as maximum for monitoring the intermediate analogue signal at the ready state (1).

Step 108: Remain in ready state (1) if the demodulator 406 detects no digital signal. Transfer from the ready state (1) to the reducing state (2) if the demodulator 406 detects a digital signal.

Step 110: Reduce the gain value with steps of a first predetermined size at the reducing state (2).

Step 112: Transfer from the reducing state (2) to the adjusting state (3) if the ADC 402 is not saturated. The saturation status of the ADC 402 can be derived from the digital signal ADC 402 while estimating the strength of the digital signal. For example, a continuous signal at a high level would indicate that the ADC 402 is saturated.

Step 114: Reduce the gain value with steps of a second predetermined size at the adjusting state (3), where the second predetermined size is smaller than the first predetermined size.

Step 116: Transfer from the adjusting state (3) to the fine-tuning state (4) after staying at the adjusting state (3) for a predetermined time interval that leaves the gain substantially stabilized, where the predetermined time interval may be equal to approximately 10 micro-seconds for example.

Step 118: Fine-tune the gain value at the fine-tuning state (4) to achieve better dynamic range of the intermediate analogue signal.

Step 120: Transfer from the fine-tuning state (4) to the demodulation state (5) if the demodulator 406 identifies the digital signal as a predetermined pattern.

Step 122: Decode the digital signal into a bit stream at the demodulation state (5).

Step 124: Transfer from the demodulation state (5) to the ready state (1) if a signal packet of the digital signal ends.

Step 126: Transfer from the fine-tuning state (4) to the ready state (1) if the demodulator 406 fails to identify the digital signal.

If the demodulator 406 is designed to be installed outside the baseband processor 400 intentionally, the corresponding embodiment can be revised as follows. The gain controller 404 has an initial state (State 0), a ready state (State 1), a reducing state (State 2), an adjusting state (State 3), a fine-tuning state (State 4), and a demodulation state (State 5). The process is described as follows.

Step 200: Enter the initial state (0) when the gain controller 404 starts to operate.

Step 202: Initialize the gain controller 404 at the initial state (0).

Step 204: Transfer from the initial state (0) to the ready state (1) after the gain controller 404 is initialized.

Step 206: Set the gain value as maximum for monitoring the intermediate analogue signal at the ready state (1).

Step 208: Transfer from the ready state (1) to the reducing state (2) if the gain controller 404 detects the digital signal.

Step 210: Reduce the gain value with steps of a first predetermined size at the reducing state (2).

Step 212: Transfer from the reducing state (2) to the adjusting state (3) if the ADC 402 is not saturated. The saturation status of the ADC 402 can be derived from the digital signal ADC 402 while estimating the strength of the digital signal. For example, a continuous signal at a high level would indicate that the ADC 402 is saturated.

Step 214: Reduce the gain value with steps of a second predetermined size at the adjusting state (3), where the second predetermined size is smaller than the first predetermined size.

Step 216: Transfer from the adjusting state (3) to the fine-tuning state (4) after staying at the adjusting state (3) for a predetermined time interval that leaves the gain substantially stabilized, where the predetermined time interval may be equal to approximately 10 micro-seconds for example.

Step 218: Fine-tune the gain value at the fine-tuning state (4) to achieve better dynamic range of the intermediate analogue signal.

Step 220: Transfer from the fine-tuning state (4) to the demodulation state (5) after staying at the fine-tuning state for a predetermined time interval where the predetermined time interval is defined according to the structure of the signal packet.

Step 222: Decode the digital signal into a bit stream at the demodulation state (5).

Step 224: Transfer from the demodulation state (5) to the ready state (1) if a signal packet of the digital signal ends.

Step 226: Transfer from the fine-tuning state (4) to the ready state (1) if the gain controller 404 cannot detect the digital signal.

Figure 8:
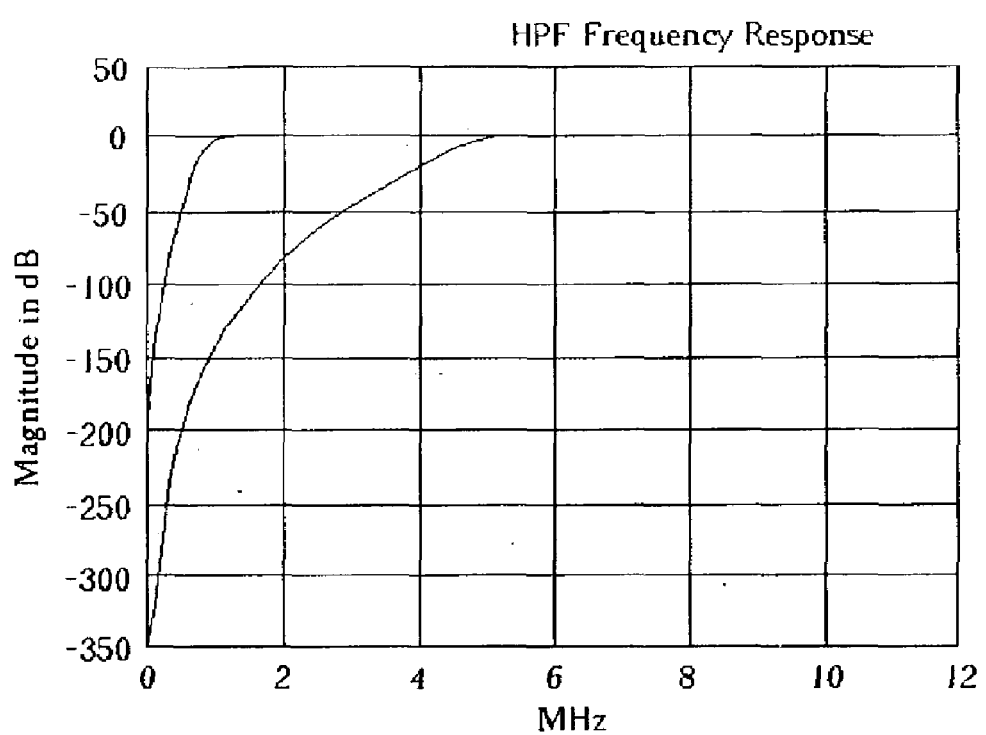
FIG. 8 is a frequency response diagram of two high pass filters of one example of the programmable filter bank in FIG. 3.

FIG. 8 shows a frequency response diagram of two high pass filters of an embodiment of the programmable filter bank 422 in FIG. 3. The left curve depicts a frequency response of 1 Mhz cutoff frequency while the right curve depicts a frequency response of 5 Mhz cutoff frequency. Obviously the high pass filter corresponding to the right curve will reduce more DC offset (and even some quasi-DC offset) than the high pass filter corresponding to the left curve, but will also remove some useful baseband information. Of course, a notch filter that extremely blocks the DC offset is preferred at the beginning of the gain training period as mentioned.

Figure 9:
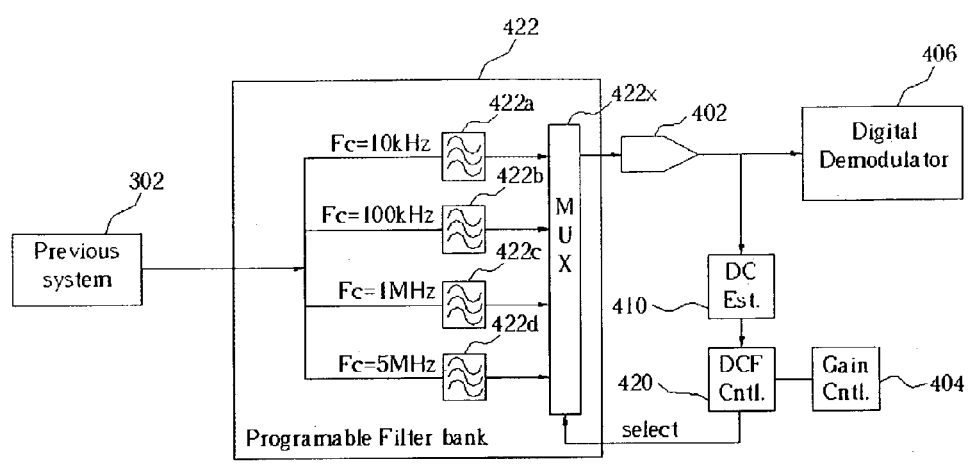
FIG. 9 is a block diagram of a preferred embodiment of the programmable filter bank in FIG. 3.

FIG. 9 is a block diagram of a preferred embodiment of the programmable filter bank 422 in FIG. 3. In FIG. 9, the programmable filter bank 422 may further comprise four high pass filters 422a, 422b, 422c, 422d coupled to the previous system 302. The programmable filter bank 422 may further comprise a multiplexer 422x for receiving output signals of the four high pass filters 422a, 422b, 422c, 422d and generating at the output of the programmable filter bank 422 the filtered signal. Each of the four high pass filters 422a, 422b, 422c, 422d has a frequency response of 10 kHz, 100 kHz, 1 Mhz, and 5 MHz cutoff frequency respectively. These cutoff frequencies are programmable to prove maximal flexibility. In a 2.4 GHz WLAN application, most of the DC offset is in the range from 5 MHz to 10 kHz.

The DCF controller 420 can dynamically select the cutoff frequency such that the DC notch bandwidth can change to filter out the unwanted DC offset. In this embodiment, the DCF controller 420 selects one of these four high pass filters 422a, 422b, 422c, 422d to filter the DC offset from the RF (Radio Frequency) input signal, that is, the intermediate analogue signal as mentioned. The DC estimator 410 provides the DCF controller 420 with the current DC offset states; the first current DC offset state is a strong DC offset and the second current DC offset state is a weak DC offset. If the current DC offset state is a digital "1" (the strong DC offset), the DCF controller 420 will select the 5 MHz-cutoff-frequency high pass filter 422d to filter out the DC offset. Although the quantity of the current DC offset states is two in this example, this is not limiting. For example, there can be more states depending on the choice of design.

Please refer to FIG. 10 showing a state transition diagram of a preferred embodiment of the programmable filter bank in FIG. 3. The illustrated AGC states are the same as that in FIG. 7 and the AGC state signal is the gain state signal received from the gain controller. At the beginning of receiving a signal packet, the DC estimator 410 detects the strong DC offset so that the DCF controller 420 selects a 5 MHz-cutoff-frequency of the programmable filter bank 422, that is, the corresponding filter 422d in FIG. 9. After approximately 10 micro-seconds, the DCF controller 420 selects a 1 MHz-cutoff-frequency of the programmable filter bank 422, that is, the corresponding filter 422c in FIG. 9, so that most of the DC offset is removed. After approximately another 5 micro-seconds, the DCF controller 420 selects a 100 kHz-cutoff-frequency of the programmable filter bank 422, that is, the corresponding filter 422b in FIG. 9. After approximately another 5 micro-seconds, the DCF controller 420 selects a 10 kHz-cutoff-frequency of the programmable filter bank 422, that is, the corresponding filter 422a in FIG. 9, and the demodulator 406 starts to decode the digital signal. The transition time is programmable for compatibility with different RF (Radio Frequency) chips such as those of the Zero-IF receivers.

Of concern, although the HPF states correspond with the AGC states in FIG. 10, this is not limiting. For example, even if the electrical connection for transmitting the gain state signal (carrying the AGC state) between the gain controller 404 and the DCF controller 420 does not exist (referring to FIG. 5), the DCF controller 420 can change the HPF state of the filter state signal after staying at each of the 5 MHz HPF state, the 1 MHz HPF state, and the 100 kHz HPF state for corresponding predetermined time period of 10 micro-seconds, 5 micro-seconds, 5 micro-seconds respectively. Of course, the lengths of the above mentioned predetermined time periods (10 micro-seconds, 5 micro-seconds, 5 micro-seconds) depend on the choice of design and can be derived from some measurement or experiment of the embodiment of this variation.

According to the baseband processor 400 provided as mentioned, the present invention correspondingly provides an electronic device for processing an analogue signal received from a previous system 302. The electronic device comprises: a signal conversion loop (referring to FIG. 3, the signal conversion loop includes the ADC 402, the gain controller 404 and the amplifier 312, and will be described in detail) for receiving the analogue signal and converting the analogue signal into a digital signal; a digital demodulator 406 for receiving and demodulating the digital signal; and a DC (direct current) offset reduction circuit coupled between the signal conversion loop and the digital demodulator 406 and comprising a first DC reduction section (similar to the above mentioned first DC offset reduction loop, and will be described in detail) for reducing a DC offset of the digital signal and a second DC reduction section (similar to the above mentioned second DC offset reduction loop, and will be described in detail) for reducing a DC offset stemming from the previous system 302.

The signal conversion loop comprises: a programmable filter bank 422 having a plurality of frequency pass characteristics and coupled to the previous system 302 for filtering the analogue signal according to a filter state signal received from a filter state input and generating at an output a filtered signal; and an ADC 402 (Analogue-to-Digital Converter) coupled to the output of the programmable filter bank 422 for converting the filtered signal into a digital signal.

The first DC reduction section comprises: a DC estimator 410 coupled to the output of the ADC 402 for estimating a DC offset of the digital signal and generating at a first output a first DC offset signal and at a second output a second DC offset signal corresponding to the DC offset; a DAC 412 (Digital-to-Analogue Converter) coupled to the first output of the DC estimator 410 for receiving as an input a first DC offset signal and generating at an output a feedback signal corresponding to the first DC offset signal; and an arithmetic module 414 coupled between the output of the programmable filter bank 422 and the input of the ADC 402 for receiving the feedback signal, the arithmetic module 414 subtracting the feedback signal from the filtered signal for canceling DC offset of the digital signal.

The second DC reduction section comprises: a DCF (DC-Filter) controller 420 comprising a first input coupled to the second output of the DC estimator 410 for receiving the second DC offset signal and generating a filter state signal at an output coupled to the filter state input for instructing the programmable filter bank 422 having the plurality of the frequency pass characteristics to reduce DC offsets of the previous system 302; and a gain controller 404 coupled to the output of the ADC 402 for estimating a DC offset of the digital signal and generating at an output a gain control signal, the gain control signal instructs the previous system 302 to adjust a strength of the analogue signal, the gain controller 404 further comprising a receiver state input coupled to an output of the demodulator 406 for receiving a receiver state signal.

In contrast to the prior art, the present invention provides DC offset reduction loops in the baseband processor and correspondingly provides an enhanced electronic device including a DC offset reduction circuit comprising related DC reduction sections.

A conspicuous advantage produced by the present invention can be sensed that the DC offset can be reduced in a flexible way so that the DC offset can be reduced effectively and the gain training period as mentioned can be shortened.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. A baseband processor for processing an intermediate analogue signal received from a previous system, the baseband processor comprising:

a programmable filter bank having a plurality of frequency pass characteristics and coupled to the previous system for filtering the intermediate analogue signal according to a filter state signal received from a filter state input and generating at an output a filtered signal;

an ADC (Analogue-to-Digital Converter) coupled to the output of the programmable filter bank for converting the filtered signal into a digital signal and generating at an output the digital signal;

a gain controller coupled to the output of the ADC for estimating a DC (Direct Current) offset of the digital signal and generating at a first output a gain control signal and at a second output a gain state signal, the gain control signal instructing the previous system to adjust a strength of the intermediate analogue signal;

a DC estimator coupled to the output of the ADC for estimating the DC offset of the digital signal and generating at a first output a first DC offset signal and at a second output a second DC offset signal corresponding to the DC offset;

a DAC (Digital-to-Analogue Converter) coupled to the first output of the DC estimator for receiving as an input the first DC offset signal and generating at an output a feedback signal corresponding to the first DC offset signal;

an arithmetic module coupled to the output of the DAC and to the output of the programmable filter bank, the arithmetic module subtracting the feedback signal from the filtered signal for canceling DC offsets of the programmable filter bank and the ADC; and a DCF (DC-Filter) controller coupled to the second output of the DC estimator and to the second output of the gain controller for receiving the second DC offset signal to instruct the programmable filter bank having the plurality of the frequency pass characteristics to reduce DC offsets of the previous system, wherein the DCF controller receives the gain state signal and generates the filter state signal at an output, to which the filter state input of the programmable filter bank is coupled.

2. The baseband processor of claim 1 wherein one of the plurality of the frequency pass characteristics of the programmable filter bank is a notch filter characteristic.

3. The baseband processor of claim 1 wherein one of the plurality of the frequency pass characteristics of the programmable filter bank is a high pass filter characteristic.

4. The baseband processor of claim 1 wherein the programmable filter bank comprises a plurality of filters.

5. The baseband processor of claim 4 wherein the plurality of filters being coupled to the previous system, the programmable filter bank further comprises a multiplexer for receiving output signals of the plurality of filters and generating at the output of the programmable filter bank the filtered signal.

6. The baseband processor of claim 1 wherein the DC estimator further comprises:
an accumulator coupled to the output of the ADC for averaging the digital signal received from the ADC and generating at an output an average signal according to an accumulating control signal received from an accumulating control input;
a shifter coupled to the output of the accumulator for shifting the average signal to the DAC according to a shifting control signal received from a shifting control input and generating at the first output of the DC estimator the first DC offset signal; and
a control unit for generating at a first output the accumulating control signal and at a second output the shifting control signal, the accumulating control input of the accumulator being coupled to the first output of the control unit and the shifting control input of the shifter being coupled to the second output of the control unit.

7. The baseband processor of claim 1 further comprising a demodulator coupled to the output of the ADC for demodulating the digital signal.

8. The baseband processor of claim 7 wherein the gain controller further comprises a receiver state input coupled to an output of the demodulator for receiving a receiver state signal.

9. The baseband processor of claim 8 wherein the gain controller further comprises:
a gain estimator coupled to the output of the ADC for estimating the strength of the digital signal received from the ADC and generating at an output a strength information signal;
a GCSM (Gain Control State Machine) coupled to the output of the gain estimator and to the output of the demodulator through the receiver state input for generating at an RXG (Receiver Gain) output an RXG signal and for generating at the second output of the gain controller the gain state signal according to the strength information signal received from the gain estimator and the receiver state signal received from the demodulator; and
an RXGDAC (Receiver Gain DAC) coupled to the RXG output of the GCSM for converting the RXG signal received from the GCSM into an analogue form and generating at the first output of the gain controller the gain control signal.

10. A baseband processor for processing an intermediate analogue signal received from a previous system, the baseband processor comprising:
a programmable filter bank having a plurality of frequency pass characteristics and coupled to the previous system for filtering the intermediate analogue signal according to a filter state signal received from a filter state input and generating at an output a filtered signal;
an ADC (Analogue-to-Digital Converter) coupled to the output of the programmable filter bank for converting the filtered signal into a digital signal and generating at an output the digital signal;
a DC estimator coupled to the output of the ADC for estimating a DC offset of the digital signal and generating at a first output a first DC offset signal corresponding to the DC offset; and
a DCF (DC-Filter) controller comprising a first input coupled to the first output of the DC estimator for receiving the first DC offset signal and generating a filter state signal at an output coupled to the filter state input for instructing the programmable filter bank having the plurality of the frequency pass characteristics to reduce DC offsets of the previous system.

11. The baseband processor of claim 10 wherein the programmable filter bank comprises a plurality of filters coupled to the previous system, the programmable filter bank further comprises a multiplexer for receiving output signals of the plurality of filters and generating at the output of the programmable filter bank the filtered signal.

12. The baseband processor of claim 11 further comprising:
a DAC (Digital-to-Analogue Converter) coupled to a second output of the DC estimator for receiving as an input a second DC offset signal and generating at an output a feedback signal corresponding to the second DC offset signal; and
an arithmetic module coupled between the output of the programmable filter bank and the input of the ADC and having an input coupled to the output of the DAC for receiving the feedback signal, the arithmetic module subtracting the feedback signal from the filtered signal for canceling DC offsets of the programmable filter bank and the ADC.

13. The baseband processor of claim 11 wherein the DC estimator further comprises:
an accumulator coupled to the output of the ADC for averaging the digital signal received from the ADC and generating at an output an average signal according to an accumulating control signal received from an accumulating control input;
a shifter coupled to the output of the accumulator for shifting the average signal to the DCF controller according to a shifting control signal received from a shifting control input and generating the first DC offset signal and the second DC offset signal; and
a control unit for generating at a first output the accumulating control signal and at a second output the shifting control signal, the accumulating control input of the accumulator being coupled to the first output of the control unit and the shifting control input of the shifter being coupled to the second output of the control unit.

14. The baseband processor of claim 10 further comprising a gain controller coupled to the output of the ADC for estimating a DC (Direct Current) offset of the digital signal and generating at an output a gain control signal, the gain control signal instructing the previous system to adjust the strength of the intermediate analogue signal.

15. The baseband processor of claim 10 further comprising a demodulator coupled to the output of the ADC for demodulating the digital signal.

16. The baseband processor of claim 15 further comprising a gain controller coupled to the output of the ADC for estimating a DC (Direct Current) offset of the digital signal and generating at an output a gain control signal, the gain control signal instructing the previous system to adjust a strength of the intermediate analogue signal, the gain controller further comprising a receiver state input coupled to an output of the demodulator for receiving a receiver state signal.

17. An electronic device for processing an analogue signal received from a previous system, the electronic device comprising:
- a signal conversion loop for receiving the analogue signal and converting the analogue signal into a digital signal, the signal conversion loop comprising:
  - a programmable filter bank having a plurality of frequency pass characteristics and coupled to the previous system for filtering the analogue signal according to a filter state signal received from a filter state input and generating at an output a filtered signal; and
  - an ADC (Analogue-to-Digital Converter) coupled to the output of the programmable filter bank for converting the filtered signal into the digital signal;
- a digital demodulator for receiving and demodulating the digital signal; and
- a DC (direct current) offset reduction circuit coupled between the signal conversion loop and the digital demodulator and comprising a first DC reduction section for reducing a DC offset of the digital signal and a second DC reduction section for reducing a DC offset stemming from the previous system;

wherein the first DC reduction section comprises:
- a DC estimator coupled to the output of the ADC for estimating a DC offset of the digital signal and generating at a first output a first DC offset signal and at a second output a second DC offset signal corresponding to the DC offset;
- a DAC (Digital-to-Analogue Converter) coupled to the first output of the DC estimator for receiving as an input the first DC offset signal and generating at an output a feedback signal corresponding to the first DC offset signal; and
- an arithmetic module coupled between the output of the programmable filter bank and the input of the ADC for receiving the feedback signal, the arithmetic module subtracting the feedback signal from the filtered signal for canceling the DC offset of the digital signal;

wherein the second DC reduction section comprises:
- a DCF (DC-Filter) controller comprising a first input coupled to the second output of the DC estimator for receiving the second DC offset signal and generating a filter state signal at an output coupled to the filter state input for instructing the programmable filter bank having the plurality of the frequency pass characteristics to reduce DC offsets of the previous system; and
- a gain controller coupled to the output of the ADC for estimating a DC offset of the digital signal and generating at an output a gain control signal, the gain control signal instructing the previous system to adjust a strength of the analogue signal, the gain controller further comprising a receiver state input coupled to an output of the demodulator for receiving a receiver state signal.

* * * * *